(12) United States Patent
Park et al.

(10) Patent No.: US 11,915,629 B2
(45) Date of Patent: Feb. 27, 2024

(54) DISPLAY APPARATUS AND CONTROL METHOD THEREOF

(71) Applicant: SAMSUNG ELECTRONICS CO., LTD., Suwon-si (KR)

(72) Inventors: Sangjun Park, Suwon-si (KR); Kwansik Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/952,951

(22) Filed: Sep. 26, 2022

(65) Prior Publication Data

US 2023/0034485 A1    Feb. 2, 2023

Related U.S. Application Data

(63) Continuation of application No. PCT/KR2022/011165, filed on Jul. 29, 2022.

(30) Foreign Application Priority Data

Jul. 30, 2021  (KR) .................. 10-2021-0101022

(51) Int. Cl.
*G09G 3/32* (2016.01)
*G09G 3/00* (2006.01)

(52) U.S. Cl.
CPC ............. *G09G 3/006* (2013.01); *G09G 3/32* (2013.01); *G09G 2300/026* (2013.01);
(Continued)

(58) Field of Classification Search
CPC ........ G09G 3/006; G09G 3/32; G09G 3/3208; G09G 2300/023; G09G 2300/026;
(Continued)

(56) References Cited

U.S. PATENT DOCUMENTS 9,508,283 B2    11/2016  Choi
10,510,320 B2   12/2019  Kang et al.
(Continued)

FOREIGN PATENT DOCUMENTS

JP    2005-286473 A    10/2005
KR    10-1006050 B1    1/2011
(Continued)

OTHER PUBLICATIONS

International Search Report (PCT/ISA/210) dated Nov. 18, 2022 issued by the International Searching Authority in International Application No. PCT/KR2022/011165.
(Continued)

*Primary Examiner* — Vijay Shankar
(74) *Attorney, Agent, or Firm* — Sughrue Mion, PLLC

(57) ABSTRACT

A display apparatus is provided. The display apparatus includes a display panel including a plurality of display modules; a memory storing information on an arrangement relation of the plurality of display modules; and a processor configured to: based on receiving a user command selecting any one of the plurality of display modules in a mode for adjusting a set value of the display panel, identify a first display module corresponding to the user command among the plurality of display modules, identify at least one second display module adjacent to the first display module among the plurality of display modules, based on the information on the arrangement relation, and control the display panel such that the first display module and the at least one second display module display a test image, and remaining display modules among the plurality of display modules display an image different from the test image.

22 Claims, 9 Drawing Sheets

(52) U.S. Cl.
CPC ............... *G09G 2320/0626* (2013.01); *G09G 2320/0666* (2013.01); *G09G 2354/00* (2013.01)

(58) Field of Classification Search
CPC ... G09G 2320/0626; G09G 2320/0666; G09G 2354/00; G06F 3/1423; G06F 3/1446
See application file for complete search history.

(56) References Cited

U.S. PATENT DOCUMENTS

| | | | |
|---|---|---|---|
| 10,594,992 | B2 | 3/2020 | Chae |
| 10,691,395 | B2 | 6/2020 | Hyeon |
| 10,990,341 | B2 | 4/2021 | Im et al. |
| 11,176,859 | B2 * | 11/2021 | Orio ................... G09G 3/3208 |
| 11,270,665 | B2 * | 3/2022 | Lee ........................ G09G 3/20 |
| 11,494,151 | B2 | 11/2022 | Choi et al. |
| 2011/0164065 | A1 | 7/2011 | Mate et al. |
| 2018/0137839 | A1 | 5/2018 | Kang et al. |
| 2019/0014294 | A1 | 1/2019 | Chae |
| 2019/0179592 | A1 | 6/2019 | Hyeon |
| 2020/0081680 | A1 | 3/2020 | Im et al. |
| 2021/0224017 | A1 | 7/2021 | Choi et al. |
| 2021/0233491 | A1 * | 7/2021 | Lee ........................ G09G 5/10 |
| 2021/0304649 | A1 * | 9/2021 | Orio ...................... G09G 3/006 |
| 2023/0089650 | A1 * | 3/2023 | Park ...................... G06T 11/40 345/1.3 |

FOREIGN PATENT DOCUMENTS

| | | |
|---|---|---|
| KR | 10-1019885 B1 | 3/2011 |
| KR | 10-2012-0114318 A | 10/2012 |
| KR | 10-1304052 B1 | 9/2013 |
| KR | 10-2017-0082878 A | 7/2017 |
| KR | 10-2018-0055541 A | 5/2018 |
| KR | 10-1869453 B1 | 7/2018 |
| KR | 10-1882016 B1 | 7/2018 |
| KR | 10-2019-0068123 A | 6/2019 |
| KR | 10-2020-0030186 A | 3/2020 |
| KR | 10-2127457 B1 | 6/2020 |
| KR | 10-2021-0042663 A | 4/2021 |
| KR | 10-2021-0093671 A | 7/2021 |

OTHER PUBLICATIONS

Written Opinion (PCT/ISA/237) dated Nov. 18, 2022 issued by the International Searching Authority in International Application No. PCT/KR2022/011165.

* cited by examiner

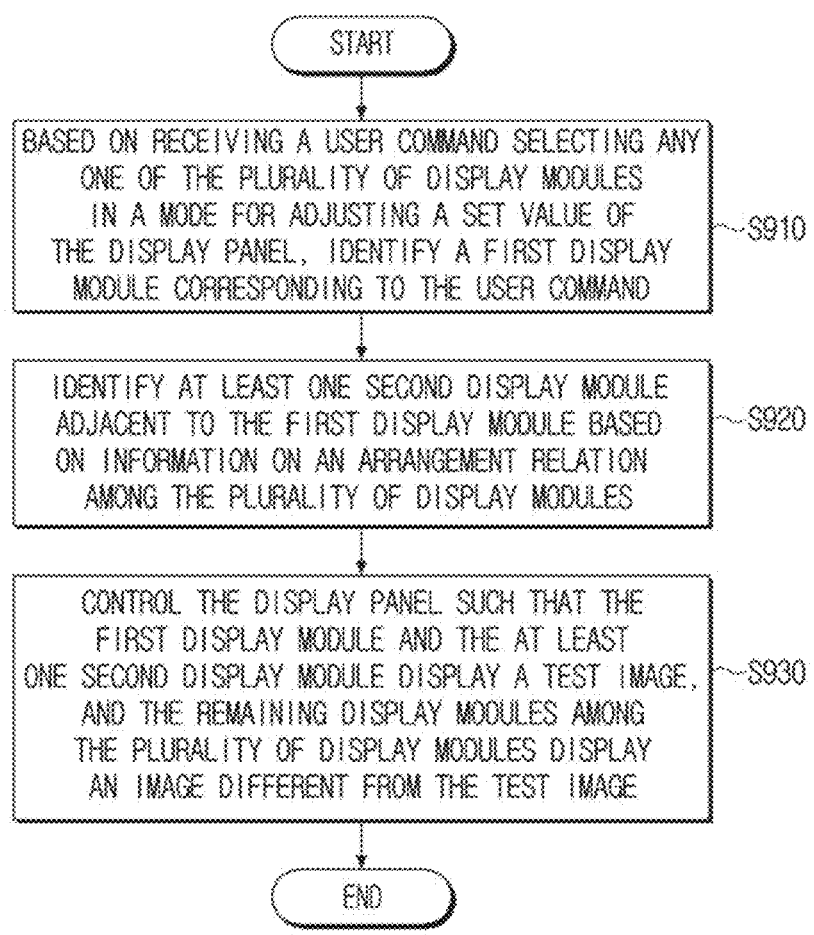

DISPLAY APPARATUS AND CONTROL METHOD THEREOF

CROSS-REFERENCE TO RELATED APPLICATION(S)

This application is a bypass continuation of International Application No. PCT/KR2022/011165, filed on Jul. 29, 2022, which is based on and claims priority to Korean Patent Application No. 10-2021-0101022, filed on Jul. 30, 2021, in the Korean Intellectual Property Office, the disclosures of which are incorporated by reference herein in their entireties.

BACKGROUND

1. Field

The disclosure relates to a display apparatus and a control method thereof, and more particularly, to a display apparatus including a plurality of display modules, and a control method thereof.

2. Description of Related Art

Recently, there is a trend that display systems in various forms are being developed and distributed.

In particular, as display systems are getting larger and their resolutions are getting higher, the number of display modules and display cabinets constituting a display system is increasing in proportion thereto.

As the number of display modules increases, difficulty of installation increases. For example, there are frequent cases wherein, in connecting cables among display modules, display apparatuses are being connected randomly apart from the conventional standardized rules, forms, and formats.

In a situation wherein there is a large number of display modules and cabinets constituting a display system, it is inconvenient and difficult to find a specific display module among several display modules.

In particular, if a specific display module is selected for resolving non-uniformity among display modules, there is a difficulty that every display module needs to be counted for identifying the selected specific display module, or numerous times of re-identification procedures need to be involved due to the installation environment of the display system.

Accordingly, there is a need for a method of helping to intuitively identify a selected specific display module.

SUMMARY

The disclosure addresses the aforementioned need by providing a display apparatus wherein a target display module corresponding to a user command among a plurality of display modules displays a test image distinguished from other display modules, and a control method thereof.

According to an aspect of the disclosure, there is provided display apparatus including: a display panel including a plurality of display modules; a memory storing information on an arrangement relation of the plurality of display modules; and a processor configured to: based on receiving a user command selecting any one of the plurality of display modules in a mode for adjusting a set value of the display panel, identify a first display module corresponding to the user command among the plurality of display modules, identify at least one second display module adjacent to the first display module among the plurality of display modules, based on the information on the arrangement relation, and control the display panel such that the first display module and the at least one second display module display a test image, and remaining display modules among the plurality of display modules display an image different from the test image.

The display panel may be divided into a plurality of groups of display modules, the information on the arrangement relation may include information on an arrangement relation among the plurality of groups, and the processor may be further configured to: identify the location of the first display module within a first group, among the plurality of groups, to which the first display module belongs, and identify the at least one second display module in the first group based on the identified location of the first display module.

The at least one second display module may include at least two display modules adjacent to the first display module in an up direction, a down direction, a left direction, a right direction, or a diagonal direction with respect to the first display module.

The processor may be further configured to identify the at least one second display module in at least one of the first group or a second group adjacent to the first group based on the identified location of the first display module and the information on the arrangement relation among the plurality of groups.

The processor may be further configured to: based on identifying that the first display module is adjacent to a display module in another group based on the identified location of the first display module, identify the second group adjacent to the first group based on the information on the arrangement relation among the plurality of groups, and identify the at least one second display module in the second group based on the information on the arrangement relation among the plurality of display modules.

The mode for adjusting the set value of the display panel may be a mode for adjusting at least one of a luminance or a color of the display panel, and the processor may be further configured to, based on a user command for adjusting at least one of the luminance or the color of the selected first display module being input, adjust at least one of the luminance or the color of the first display module based on the user command.

The processor may be further configured to: based on a user command selecting a third display module, among the plurality of display modules, adjacent to the first display module in a first direction being received, identify at least one fourth display module, among the plurality of display modules, adjacent to the third display module based on the information on the arrangement relation, and control the display panel such that the third display module and the at least one fourth display module display the test image, and the remaining display modules among the plurality of display modules display the image different from the test image.

The processor may be further configured to control the display panel such that the respective remaining display modules display the test image having at least one of a luminance or a color that is different from a luminance or a color of the test image displayed on the first display module and the at least one second display module, based on a distance from the first display module.

The processor may be further configured to control the display panel such that the respective remaining display modules display the test image having the luminance that is sequentially lower than the luminance of the first display module as the distance from the first display module increases.

The processor may be further configured to: based on receiving a signal corresponding to an increase or a decrease of the luminance in the mode for adjusting the luminance of the display panel, increase or decrease the luminance of the first display module based on the received signal, and based on receiving a signal corresponding to an increase or a decrease of the color in the mode for adjusting the color of the display panel, increase or decrease the color of the first display module based on the received signal.

According to an aspect of the disclosure, a control method of a display apparatus including a display panel including a plurality of display modules, includes: based on receiving a user command selecting any one of the plurality of display modules in a mode for adjusting a set value of the display panel, identifying a first display module corresponding to the user command among the plurality of display modules; identifying at least one second display module adjacent to the first display module among the plurality of display modules, based on information on an arrangement relation among the plurality of display modules; and controlling the display panel such that the first display module and the at least one second display module display a test image, and remaining display modules among the plurality of display modules display an image different from the test image.

The display panel may be divided into a plurality of groups of display modules, the information on the arrangement relation may include information on an arrangement relation among the plurality of groups, and the identifying the at least one second display module may include: identifying the location of the first display module within a first group, among the plurality of groups, to which the first display module belongs; and identifying the at least one second display module in the first group based on the identified location of the first display module.

The at least one second display module may include at least two display modules adjacent to the first display module in an up direction, a down direction, a left direction, a right direction, or a diagonal direction with respect to the first display module.

The identifying the at least one second display module may include identifying the at least one second display module in at least one of the first group or a second group adjacent to the first group based on the identified location of the first display module and the information on the arrangement relation among the plurality of groups.

The identifying the at least one second display module may include: based on identifying that the first display module is adjacent to a display module in another group based on the identified location of the first display module, identifying the second group adjacent to the first group based on the information on the arrangement relation among the plurality of groups; and identifying the at least one second display module in the second group based on the information on the arrangement relation among the plurality of display modules.

According to one or more embodiments of the disclosure, when selecting a specific display module for adjusting the luminance, the color, etc. in a display apparatus including a plurality of display modules (or display cabinets), a user can easily identify a selected display module.

Also, without a need for the user to consider a connection relation among the plurality of display modules, identification information of the respective display modules, etc., the user can easily identify a specific display module selected according to a user command, or a specific display module that was newly selected according to a movement of a direction.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is a flow chart illustrating a control method of a display apparatus according to an embodiment of the disclosure.

DETAILED DESCRIPTION

Figure 1:
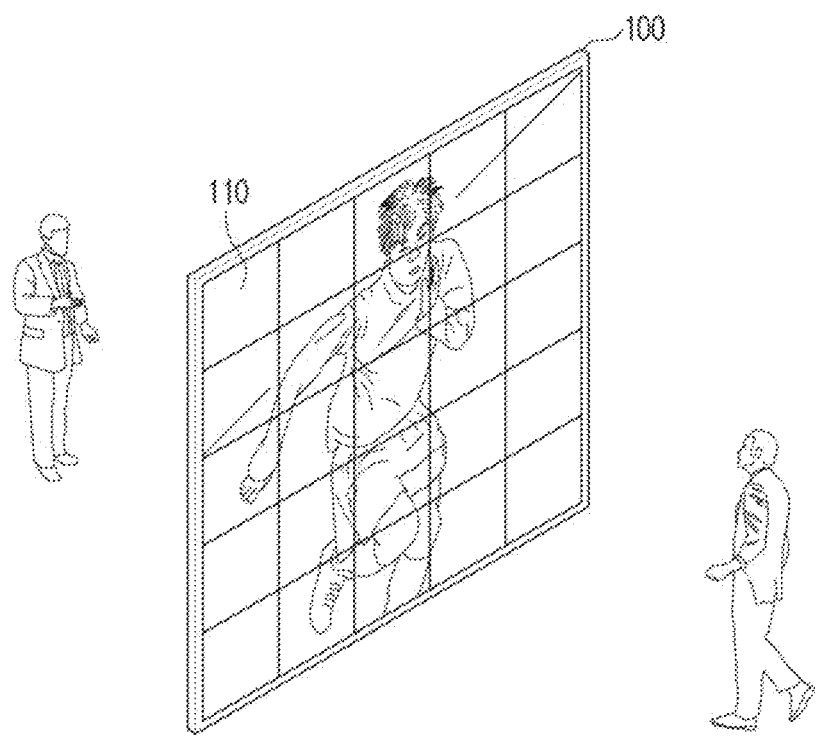
FIG. 1 is a diagram illustrating a display apparatus according to an embodiment of the disclosure.

First, terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art who work in the pertinent technical field or previous court decisions, emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, or alternatives included in the idea and the technical scope disclosed herein. In describing the embodiments, in case it is determined that detailed explanation of related known technologies may unnecessarily confuse the gist of the disclosure, the detailed explanation will be omitted.

In addition, terms such as "first," "second" and the like may be used to describe various components, but the components are not intended to be limited by the terms. The terms are used only to distinguish one component from another component.

Further, singular expressions include plural expressions, as long as they do not mean differently in the context. Also, in the disclosure, terms such as "include" and "comprise" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, in the disclosure, "a module" or "a part" performs at least one function or operation, and may be implemented as hardware or software, or as a combination of hardware and software. Further, a plurality of "modules" or "parts" may be integrated into at least one module and implemented as at least one processor, except "modules" or "parts" which need to be implemented as specific hardware.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

FIG. 1 is a diagram for illustrating a display apparatus according to an embodiment of the disclosure.

Referring to FIG. 1, a display apparatus 100 displays video data. Here, the display apparatus 100 may be implemented as a television (TV), but is not limited thereto, and any apparatus that is equipped with a display function can be applied without limitation, such as a video wall, a large format display (LFD), digital signage, a digital information display (DID), a projector display, etc. Also, the display apparatus 100 may be implemented as displays in various forms such as a liquid crystal display (LCD) panel, an organic light-emitting diode (OLED) display panel, a liquid crystal on silicon (LCoS) display panel, a digital light processing (DLP) display panel, a quantum dot (QD) display panel, a quantum dot light-emitting diode (QLED) display panel, a micro light-emitting diode (μLED) display panel, a mini LED display panel, etc. The display apparatus 100 may also be implemented as a touch screen combined with a touch sensor, a flexible display, a rollable display, a 3D display, a display wherein a plurality of display modules are physically connected, etc.

Figure 2:
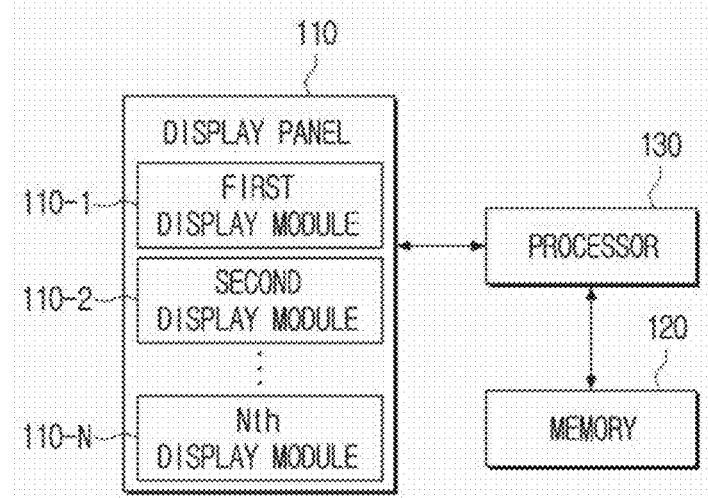
FIG. 2 is a block diagram illustrating a configuration of a display apparatus according to an embodiment of the disclosure.

A display panel 110 included in the display apparatus 100 according to an embodiment of the disclosure may include a plurality of display modules 110-1 to 110-*n* (see FIG. 2).

The plurality of display modules 110-1 to 110-*n* constituting the display panel 110 according to an embodiment of the disclosure may be divided into a plurality of cabinets.

As an example, each of the plurality of cabinets may include a predetermined number (n) of display modules. For example, 12 display modules may constitute one cabinet, and the plurality of cabinets may constitute one display panel 110. Here, the specific number is merely an example for the convenience of explanation, and embodiments of the disclosure are not limited thereto.

Accordingly, a cabinet may be a unit referring to the display modules constituting the cabinet (e.g., 12 display modules), and a cabinet may also be referred to as a group or a sub-screen. Hereinafter, a cabinet will be generally referred to as a group for the convenience of explanation. Detailed explanation in this regard will be provided later with reference to FIG. 4.

Each of the plurality of display modules 110-1 to 110-*n* according to an embodiment may include a plurality of self-luminous elements. Here, the self-luminous elements may be at least one of light emitting diodes (LED) or micro LED. Here, the micro LEDs are LEDs in a size of about 5-100 micrometers, and they are subminiature light-emitting elements that emit a light without a color filter.

FIG. 1 is a diagram illustrating the front surface of the display apparatus 100 according to an embodiment of the disclosure. The display apparatus 100 according to an embodiment may be implemented as a video wall, a large format display (LFD), digital signage, etc. and installed in public spaces, commercial spaces, etc., and the display apparatus 100 may provide information, entertainment, advertisements, etc. to unspecified individuals. As the size of the display apparatus 100 became larger, there is a trend that the number of the plurality of display modules 110-1 to 110-*n* constituting the display apparatus 100 also increases in proportion thereto.

Also, the plurality of display modules 110-1 to 110-*n* constituting the display panel 110 may be arranged without an assembly tolerance between them, i.e., seamlessly.

As the number of the display modules constituting the display panel 110 increases, and the boundaries among the display modules are not identifiable with the naked eye, there is a problem that it is difficult to specify any one of the plurality of display modules 110-1 to 110-*n*.

For example, in case any one of the plurality of display modules 110-1 to 110-*n* is selected for setting uniformity of the luminance and the color among the plurality of display modules 110-1 to 110-*n*, there has been a problem that it is difficult for a setter (or an engineer related to the display apparatus 100, referred to as a "user" hereinafter) to identify with the naked eye which display module is selected (e.g., where it is located), and how much non-uniformity the selected display module has with an adjacent display module. Hereinafter, a method for an electronic apparatus or the display apparatus 100 to track each of the plurality of display modules 110-1 to 110-*n* for effective maintenance, repair, management, etc. of the plurality of display modules 110-1 to 110-*n* as the number of the plurality of display modules 110-1 to 110-*n* included in the display apparatus 100 increased, and in case a specific display module is selected for adjusting set values (e.g., a luminance value, a color value, etc.) of each of the plurality of display modules 110-1 to 110-*n*, a method for the display apparatus 100 to display a specific image (e.g., a specific test image) so that the selected display module among the plurality of display modules 110-1 to 110-*n* can be identified easily, and it can be identified easily how much non-uniformity the selected display module has with adjacent display modules will be described through various embodiments.

FIG. 2 is a block diagram illustrating a configuration of a display apparatus according to an embodiment of the disclosure.

Referring to FIG. 2, the display apparatus 100 may include a display panel 110, a memory 120, and a processor 130.

The display apparatus 100 according to an embodiment of the disclosure may be one of a plurality of display apparatuses constituting a modular display apparatus (i.e., a display system), and it may be implemented as an independent display apparatus 100 by itself, and include a plurality of display modules 110-1 to 110-n.

The display panel 110 according to an embodiment may include the plurality of display modules 110-1 to 110-n. The display panel 110 may display various images. Here, an image may include a still image and a moving image, and the display panel 110 may display various images such as broadcasting content, multimedia content, etc. Also, the display panel 110 may display a user interface (UI) and icons.

Each of the plurality of display modules 110-1 to 110-n constituting the display panel 110 may include an integrated circuit (IC) chip, and the IC chip may display an image based on an image signal received from the processor 130. As an example, an IC chip may generate an LED driving signal based on an image signal received from the processor 130, and display an image by controlling light emission of a plurality of pixels included in the display module based on the LED driving signal. According to an embodiment, an IC chip may be an LED driver IC chip.

The display panel 110 according to an embodiment of the disclosure may be implemented as a display including self-luminous elements, or a display including non-self-luminous elements and a backlight. For example, the display panel 110 may be implemented as displays in various forms such as a liquid crystal display (LCD) panel, an organic light-emitting diode (OLED) display panel, a light emitting diodes (LED) display panel, a micro LED display panel, a mini LED display panel, a plasma display panel (PDP), a quantum dot (QD) display panel, a quantum dot light-emitting diode (QLED) display panel, etc. In the display panel 110, driving circuits that may be implemented in forms such as an a-si TFT, a low temperature poly silicon (LTPS) TFT, an organic TFT (OTFT), etc., a backlight unit, etc. may also be included. The display panel 110 may also be implemented as a touch screen combined with a touch sensor, a flexible display, a rollable display, a 3D display, a display wherein the plurality of display modules 110-1 to 110-n are physically connected, etc.

The memory 120 may store data necessary for the various embodiments of the disclosure. The memory 120 may be implemented in a form of a memory included in the display apparatus 100, or in a form of a memory that can be attached to or detached from the display apparatus 100, according to the usage of stored data. For example, in the case of data for operating the display apparatus 100, the data may be stored in a memory included in the display apparatus 100, and in the case of data for an extended function of the display apparatus 100, the data may be stored in a memory that can be attached to or detached from the display apparatus 100. In the case of a memory included in the display apparatus 100, the memory may be implemented as at least one of a volatile memory (e.g., a dynamic RAM (DRAM), a static RAM (SRAM), or a synchronous dynamic RAM (SDRAM), etc.) or a non-volatile memory (e.g., an one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash, etc.), a hard drive, or a solid state drive (SSD)).

Also, in the case of a memory that can be attached to or detached from the display apparatus 100, the memory may be implemented in forms such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), etc.

According to an embodiment, the memory 120 may store at least one instruction or a computer program including instructions for controlling the display apparatus 100.

In the aforementioned embodiment, it was described that various kinds of data are stored in an external memory 120 of the processor 130, but at least some of the aforementioned data may be stored in an internal memory of the processor 130 according to implementation examples of at least one of the display apparatus 100 or the processor 130.

In particular, the memory 120 may store information on an arrangement relation among the plurality of display modules 110-1 to 110-n. Specifically, the information on the arrangement relation among the plurality of display modules 110-1 to 110-n may mean the coordinate information allotted to each of the plurality of display modules 110-1 to 110-n, the connection relation of each of the plurality of display modules 110-1 to 110-n, and/or the arrangement information of each of the plurality of display modules 110-1 to 110-n. For example, the information on the arrangement relation may be information on rows and columns in a form of (x, y) allotted to each of the plurality of display modules 110-1 to 110-n. However, this is merely an example, and it will be understood that the information on the arrangement relation can include information in various forms that can identify the locations of each of the plurality of display modules 110-1 to 110-n.

Also, the information on the arrangement relation stored in the memory 120 may include information on an arrangement relation among a plurality of groups constituting the display panel 110. As described above, the display panel 110 may include a plurality of groups, and each of the plurality of groups may include the plurality of display modules 110-1 to 110-n. Accordingly, the information on the arrangement relation may include information on the arrangement relation among the plurality of groups, and the information on the arrangement relation among the plurality of groups may mean at least one of the coordinate information allotted to each of the plurality of groups, the connection relation of each of the plurality of groups, or the arrangement information of each of the plurality of groups. Detailed explanation in this regard will be made later with reference to FIGS. 3 and 4.

The processor 130 according to an embodiment is electronically connected with the memory 120, and controls the overall operations of the display apparatus 100.

According to an embodiment of the disclosure, the processor 130 may be implemented as a digital signal processor (DSP) processing digital signals, a microprocessor, and a time controller (TCON). However, the disclosure is not limited thereto, and the processor 130 may include one or more of a central processing unit (CPU), a micro controller unit (MCU), a micro processing unit (MPU), a controller, an application processor (AP), or a communication processor (CP), an ARM processor, and an artificial intelligence (AI) processor, or may be defined by the terms. Also, the processor 130 may be implemented as a system on chip (SoC) having a processing algorithm stored therein or large scale integration (LSI), or in the form of a field programmable gate array (FPGA). The processor 130 may perform various functions by executing computer executable instructions stored in the memory 120.

The processor 130 according to an embodiment may transmit video data respectively to the plurality of display modules 110-1 to 110-n that constitute the display apparatus 100 and are connected with one another in various ways or to the plurality of groups.

In particular, the processor 130 may transmit a test image to a specific display module among the plurality of display modules 110-1 to 110-n, and the specific display module may display the test image. Detailed explanation in this regard will be made with reference to FIG. 3.

Figure 3:
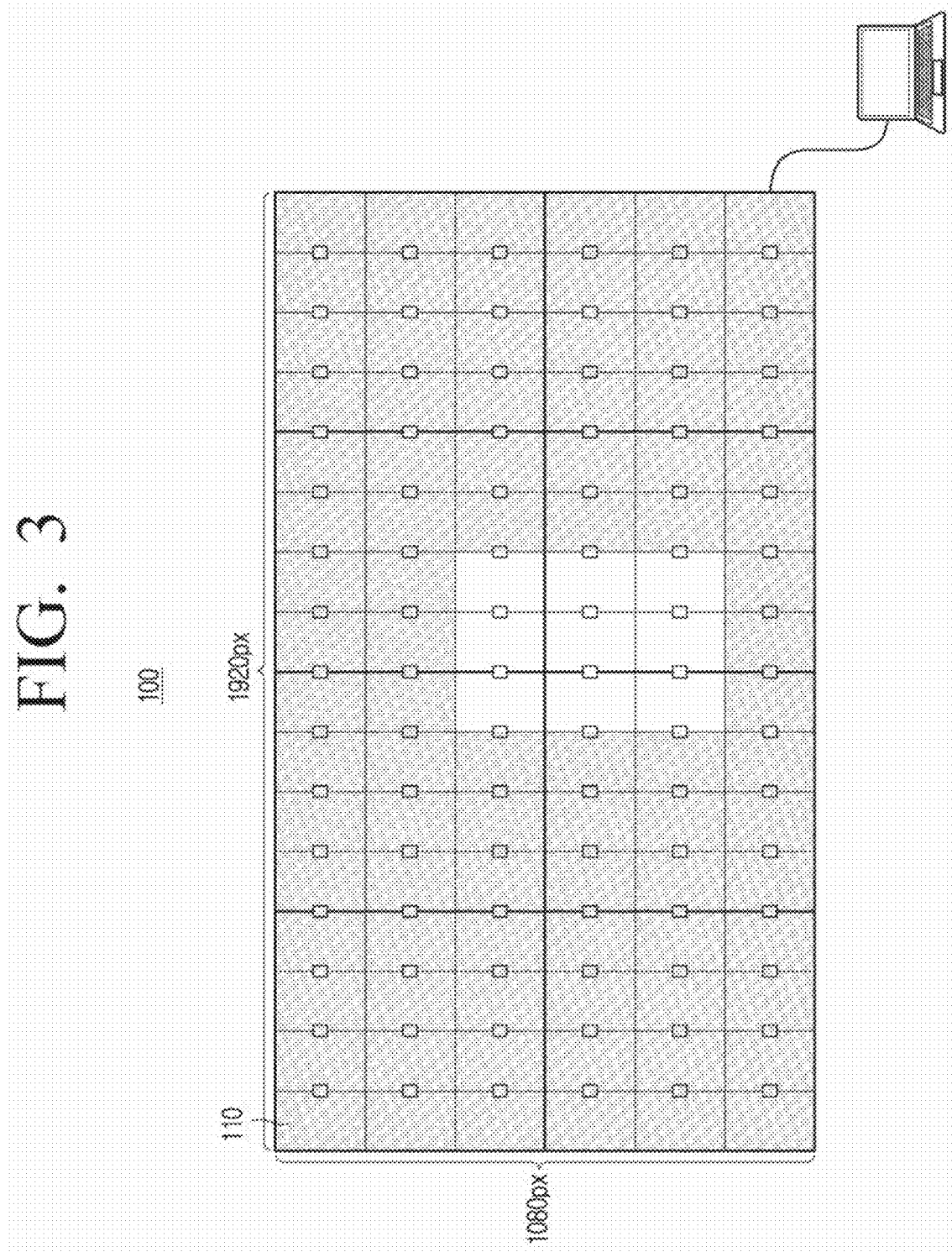
FIG. 3 is a diagram illustrating a test image according to an embodiment of the disclosure.

FIG. 3 is a diagram illustrating a test image according to an embodiment of the disclosure.

Referring to FIG. 3, if a user command selecting any one of the plurality of display modules 110-1 to 110-n in a mode for adjusting a set value of the display panel 110 is received, the processor 130 may identify a first display module 110-1 corresponding to the user command.

For example, the display apparatus 100 may perform communication with an electronic apparatus, and if a user command selecting any one of the plurality of display modules 110-1 to 110-n included in the display apparatus 100 is received from the electronic apparatus, the display apparatus 100 may identify the first display module 110-1 corresponding to the user command. Here, the electronic apparatus may be implemented as an apparatus that performs wired or wireless communication with the display apparatus 100, and transmits a control signal, video data, a signal for adjusting set values (e.g., a luminance value, a color value) of the display apparatus 100, etc. to the display apparatus 100.

An electronic apparatus according to an embodiment of the disclosure may include at least one of a smartphone, a tablet PC, a mobile phone, a video phone, an e-book reader, a desktop PC, a laptop PC, a netbook computer, a workstation, a server, a PDA, a portable multimedia player (PMP), an MP3 player, a medical instrument, a camera, a virtual reality (VR) implementation device, or a wearable device. Here, a wearable device may include at least one of an accessory-type device (e.g., a watch, a ring, a bracelet, an ankle bracelet, a necklace, glasses, a contact lens, or a head-mounted-device (HMD)), a device integrated with fabrics or clothing (e.g., electronic clothing), a body-attached device (e.g., a skin pad or a tattoo), or an implantable circuit. In some embodiments, an electronic apparatus may include at least one of a television, a digital video disk (DVD) player, an audio, a refrigerator, an air conditioner, a cleaner, an oven, a microwave oven, a washing machine, an air cleaner, a set top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, or an electronic photo frame.

In another embodiment, an electronic apparatus may include at least one of various types of medical instruments (e.g., various types of portable medical measurement instruments (a blood glucose meter, a heart rate meter, a blood pressure meter, or a thermometer, etc.), magnetic resonance angiography (MRA), magnetic resonance imaging (MRI), computed tomography (CT), a photographing device, or an ultrasonic instrument, etc.), a navigation device, a global navigation satellite system (GNSS), an event data recorder (EDR), a flight data recorder (FDR), a vehicle infotainment device, an electronic device for vessels (e.g., a navigation device for vessels, a gyrocompass, etc.), avionics, a security device, a head unit for a vehicle, an industrial or a household robot, a drone, an ATM of a financial institution, a point of sales (POS) of a store, or an Internet of Things (IoT) device (e.g., a light bulb, various types of sensors, a sprinkler device, a fire alarm, a thermostat, a street light, a toaster, exercise equipment, a hot water tank, a heater, a boiler, etc.).

According to the various embodiments of the disclosure, the display apparatus 100 may receive a user command by itself, and identify any one display module (e.g., the first display module 110-1) corresponding to the user command among the plurality of display modules 110-1 to 110-n. Also, the display apparatus 100 can identify any one display module (e.g., the first display module 110-1) among the plurality of display modules 110-1 to 110-n based on a signal received from the electronic apparatus.

Then, the processor 130 may identify at least one second display module 110-2 adjacent to the first display module 110-1 based on the information on the arrangement relation stored in the memory 120.

Then, the processor 130 may control the display panel 110 such that the first display module 110-1 and the at least one second display module 110-2 display a test image, and the remaining display modules excluding the first display module 110-1 and the at least one second display module 110-2 among the plurality of display modules 110-1 to 110-n display an image different from the test image.

Here, the test image means a red, a green, a blue, or a white image of full colors, but the disclosure is not limited thereto, and the test image can mean an image including a specific character, a specific symbol, a specific shape, a specific pattern, etc.

Referring to FIG. 3, according to an embodiment, the first display module 110-1 corresponding to a user command and the at least one second display module 110-2 display a test image different from the remaining display modules. Thus, from a user's viewpoint, a specific display module (i.e., the first display module 110-1) selected by a user can be easily identified among the plurality of display modules 110-1 to 110-n.

Also, the first display module 110-1 and the at least one second display module 110-2 display the same test image, and accordingly, from a user's viewpoint, non-uniformity between a specific display module (i.e., the first display module 110-1) selected by a user and adjacent display modules (i.e., the at least one second display module 110-2) can be easily identified, and a set value (e.g., a luminance value or a color value) of the specific display module can be adjusted.

As the number of the display modules constituting the display apparatus 100 increases, there was a problem that it was difficult to identify a specific display module (e.g., a module wherein an error occurred, or a module for which adjustment of a set value is required) in an installation process or an apparatus setting process. For example, there was a problem that it was difficult to identify with the naked eye which the display module is currently selected according to a user command among the plurality of display modules 110-1 to 110-n, and it was difficult to move and track from the currently selected display module to the specific display module (e.g., a module wherein an error occurred, or a module for which adjustment of a set value is required).

Referring to FIG. 3, as a specific display module (e.g., the first display module 110-1) selected by a user outputs a test image different from the remaining display modules, from a user's viewpoint, the specific display module (i.e., the first display module 110-1) selected according to the user command among the plurality of display modules 110-1 to 110-$n$ can be easily identified.

Here, the at least one second display module 110-2 is a display module arranged to be adjacent to the first display module 110-1 corresponding to the user command among the plurality of display modules 110-1 to 110-$n$, and for example, it may include a plurality of display modules located in up, down, left, and right directions or diagonal directions based on the first display module 110-1.

The processor 130 may identify the at least one second display module 110-2 arranged to be adjacent to the first display module 110-1 based on the information on the arrangement information among the plurality of display modules 110-1 to 110-$n$, and control the display panel 110 such that the first display module 110-1 and the at least one second display module output the same test image.

From a user's viewpoint, by fine tuning a luminance or a color value of the first display module 110-1 while the first display module 110-1 and the at least one second display module 110-2 output the same test image, non-uniformity with another display module (e.g., the at least one second display module 110-2) can be resolved.

For convenience of explanation, the first display module 110-1, the second display module 110-2, etc. will not refer to a display module arranged in a specific location among the plurality of display modules 110-1 to 110-$n$ constituting the display panel, but a specific display module selected according to a user command among the plurality of display modules 110-1 to 110-$n$ will be referred to as the first display module 110-1, and a display module adjacent to the first display module 110-1 will be referred to as the second display module 110-2.

Figure 4:
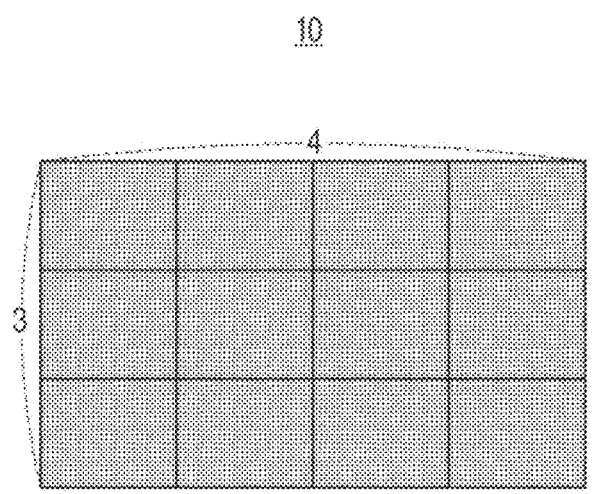
FIG. 4 is a diagram illustrating a group including a plurality of display modules according to an embodiment of the disclosure.

FIG. 4 is a diagram illustrating a group including a plurality of display modules according to an embodiment of the disclosure.

First, each of the plurality of display modules 110-1 to 110-$n$ may be implemented as an LED display module including inorganic light emitting diodes (LED).

Each of the plurality of display modules 110-1 to 110-$n$ according to an embodiment of the disclosure may be implemented as an LED display module including a plurality of pixels including a red (R) sub-pixel, a green (G) sub-pixel, and a blue (B) sub-pixel.

For example, one group 10 among the plurality of groups constituting the display panel 110 may be implemented in a form wherein twelve display modules are combined in a matrix arrangement of 4×3. The one group in an arrangement of 4×3 is just an example, and the forms and the number of arrangements of display modules may be changed variously. For example, the number of pixels included in one display module can be changed variously according to the purpose of the manufacturer, the manufacturing process, etc., and the forms and the number of arrangements of display modules constituting one group can also be changed variously according to the purpose of the manufacturer, the manufacturing process, etc.

Referring to FIG. 4, twelve display modules are combined in an arrangement of 4×3 and constitute one group (or, a cabinet, a sub-screen), and a plurality of groups may constitute one display apparatus 100. However, the number of groups constituting the display apparatus 100 can be changed variously according to the purpose of the manufacturer and the manufacturing process, or the resolution, the size, etc. according to the specification of the display apparatus 100.

Detailed explanation in this regard will be made with reference to FIG. 5.

Figure 5:
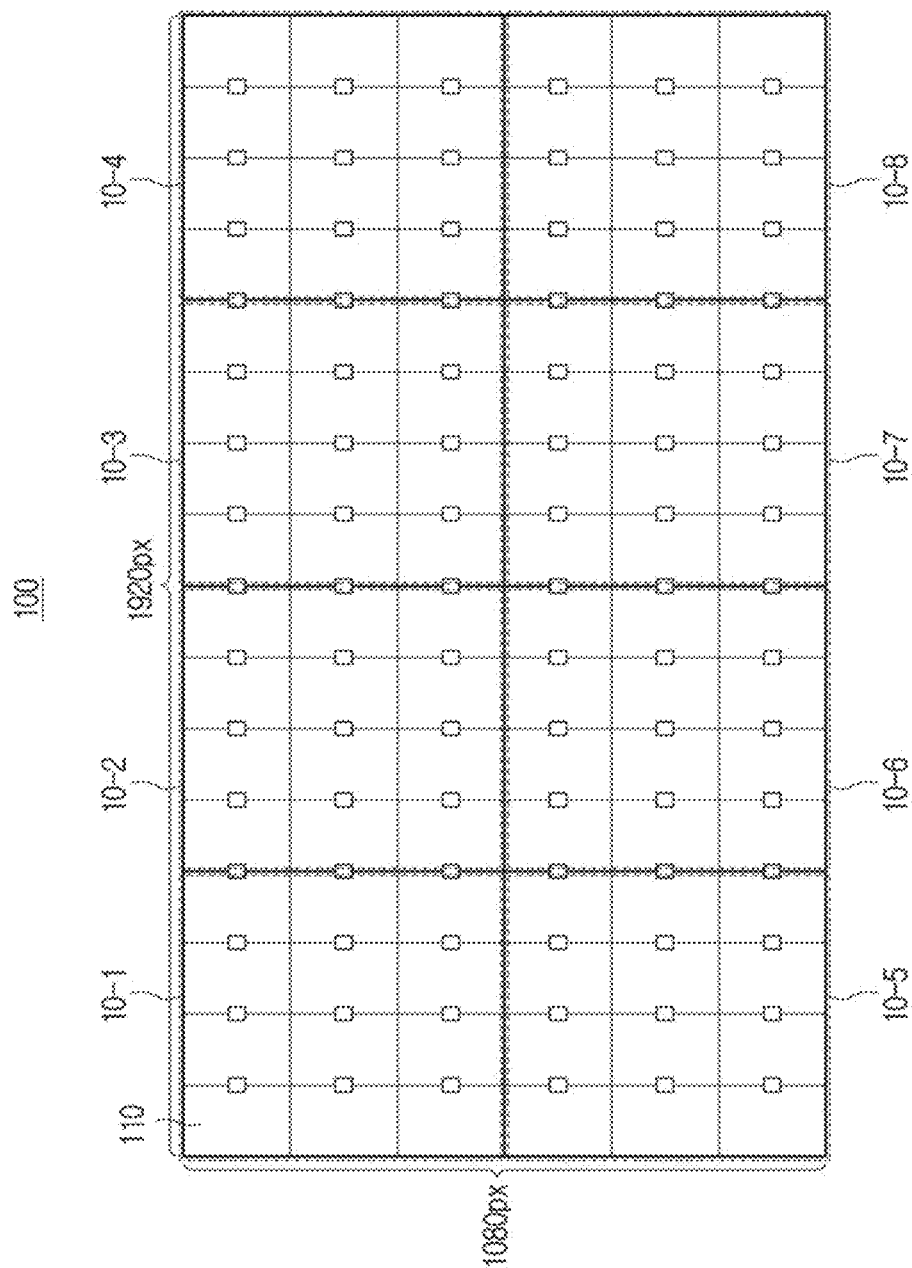
FIG. 5 is a diagram illustrating a plurality of groups constituting a display apparatus according to an embodiment of the disclosure.

FIG. 5 is a diagram illustrating a plurality of groups constituting a display apparatus according to an embodiment of the disclosure.

Referring to FIG. 5, the plurality of display modules 110-1 to 110-$n$ constituting the display panel 110 may be divided into a plurality of groups 10-1 to 10-$n$.

As described above, the memory 120 includes information on an arrangement relation among the plurality of display modules 110-1 to 110-$n$ constituting the display apparatus 100, and the information on the arrangement relation can include information on an arrangement relation among the plurality of groups constituting the display apparatus 100. Here, the information on the arrangement relation may include coordinate information, identification information, location information, or connection relation information, etc. allotted to each of the plurality of display modules 110-1 to 110-$n$ or the plurality of groups.

For example, as the resolution, the size, etc. of the display apparatus 100 increase, the number of the plurality of display modules 110-1 to 110-$n$ or the plurality of groups 10-1 to 10-$n$ included in the display apparatus 100 also increases in proportion thereto. In this case, the arrangement relation or the communication connection relation among the plurality of display modules 110-1 to 110-$n$ may be changed in a complex way, and also, in various ways other than the conventional standardized communication connection relation or daisy chain communication connection relation.

Accordingly, for the processor 130 to identify the first display module 110-1 corresponding to a user command, and identify the at least one second display module 110-2 adjacent to the identified first display module 110-1, the processor 130 may identify the location of the first display module 110-1 within the first group 10-1 to which the first display module 110-1 corresponding to the user command belongs based on the information on the arrangement relation among the plurality of display modules 110-1 to 110-$n$ and the information on the arrangement relation among the plurality of groups 10-1 to 10-$n$ stored in the memory 120, and identify the at least one second display module adjacent to the first display module 110-1 within the first group 10-1 based on the identified location.

The at least one second display module adjacent to the first display module 110-1 may be included in the same group as the first display module 110-1 (e.g., the first group 10-1), but it may be included in a different group (e.g., the second group 10-2).

The processor 130 according to an embodiment of the disclosure may identify the location of the first display module 110-1 within the first group to which the first display module 110-1 belongs. Then, the processor 130 may identify the at least one second display module 110-2 adjacent to the first display module 110-1 in at least one of the first group 10-1 or the second group 10-2 adjacent to the first group 10-1, based on the identified location and the information on the arrangement relation among the plurality of groups.

Detailed explanation in this regard will be made with reference to FIG. 6.

Figure 6:
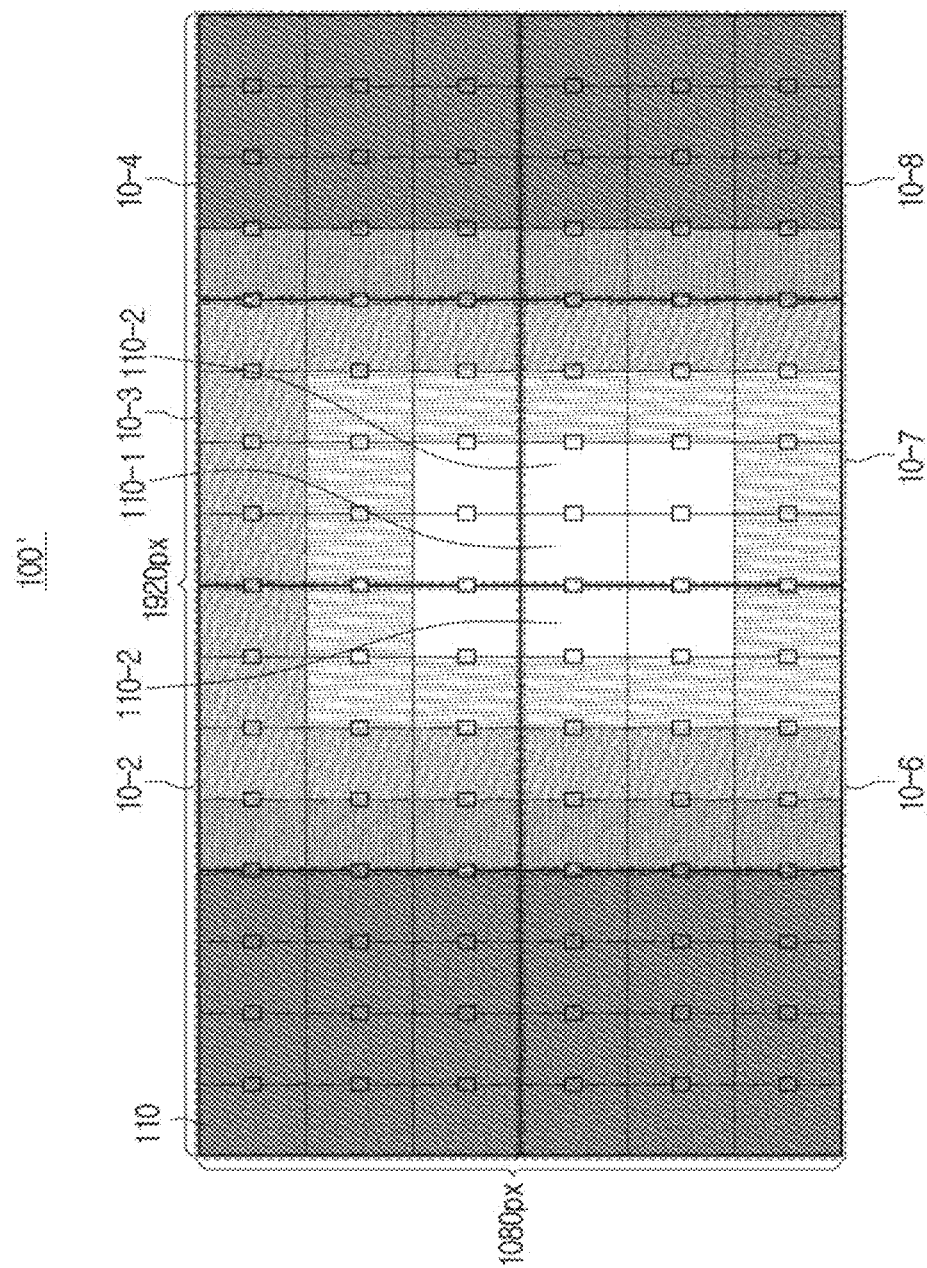
FIG. 6 is a diagram illustrating a display apparatus displaying a pattern according to an embodiment of the disclosure.

FIG. 6 is a diagram illustrating a display apparatus displaying a pattern according to an embodiment of the disclosure.

Referring to FIG. 6, the processor 130 may identify the location of the first display module 110-1 corresponding to a user command based on the information on the arrangement relation, and identify whether the first display module 110-1 is adjacent to a display module in another group based on the identified location.

For example, the processor 130 may identify a seventh group 10-7 to which the first display module 110-1 belongs, and identify whether the at least one second display module 110-2 adjacent to the first display module 110-1 belongs to a third group 10-3, a sixth group 10-6, etc. but not the seventh group 10-7.

Then, if it is identified that the first display module 110-1 is adjacent to a display module in another group, the processor 130 may identify the second group 10-2, the third group 10-3, the fourth group 10-4, the sixth group 10-6, and the eighth group 10-8, etc. adjacent to the seventh group 10-7 based on the information on the arrangement relation among the plurality of groups 10-1 to 10-n.

Then, the processor 130 may identify the at least one second display module 110-2 adjacent to the first display module 110-1 in each of the second group 10-2, the third group 10-3, the fourth group 10-4, the sixth group 10-6, the seventh group 10-7, and the eighth group 10-8 based on the information on the arrangement relation among the plurality of display modules 110-1 to 110-n.

The processor 130 according to an embodiment of the disclosure may control the display panel 110 such that the first display module 110-1 and the identified at least one second display module 110-2 output the same test image. As an example, the test image may be a white image.

As an example, the processor 130 may control the display panel 110 such that the respective remaining display modules among the plurality of display modules 110-1 to 110-n display a test image wherein at least one of the luminance or the color is different from the test image (e.g., a full white image) displayed on the first display module 110-1 and the at least one second display module 110-2 based on the distance from the first display module 110-1.

As illustrated in FIG. 6, as the first display module 110-1 corresponding to a user command and the at least one second display module 110-2 adjacent to the first display module 110-1 among the plurality of display modules 110-1 to 110-n output the same test image, and the remaining display modules output a different test image, from a user's viewpoint, the location of the display module selected according to a user command (i.e., the first display module 110-1) among the plurality of display modules 110-1 to 110-n can be easily identified.

Also, while the first display module 110-1 and the at least one second display module 110-2 are displaying the same test image (e.g., a full white image), from a user's viewpoint, occurrence of non-uniformity in the luminance and the color with the adjacent display module (i.e., the at least one second display module 110-2) can be minimized by adjusting the set value (e.g., the luminance value, the color value), etc. of the first display module 110-1.

According to an embodiment, the display apparatus 100 provides a mode for adjusting a set value of the display panel 110, and the mode may be a mode for adjusting at least one of the luminance or the color of the display panel 110.

If a user command for adjusting at least one of the luminance or the color of the first display module 110-1 selected according to a user command is input, the processor 130 may adjust at least one of the luminance or the color of the first display module 110-1 based on the user command. Here, the user command for adjusting at least one of the luminance or the color of the first display module 110-1 may be received through an input interface included in the display apparatus 100. Also, the user command can be received through an electronic apparatus performing wired or wireless communication with the display apparatus 100.

In case the remaining display modules excluding the first display module 110-1 and the at least one second display module 110-2 output a different test image, the processor 130 according to an embodiment of the disclosure may control the display panel 110 such that the respective remaining display modules output a different test image based on a predetermined condition. If the respective remaining display modules output a different test image according to the predetermined condition, the display apparatus 100 may display a pattern, as illustrated in FIG. 6. Detailed explanation in this regard will be made with reference to FIG. 7.

Figure 7:
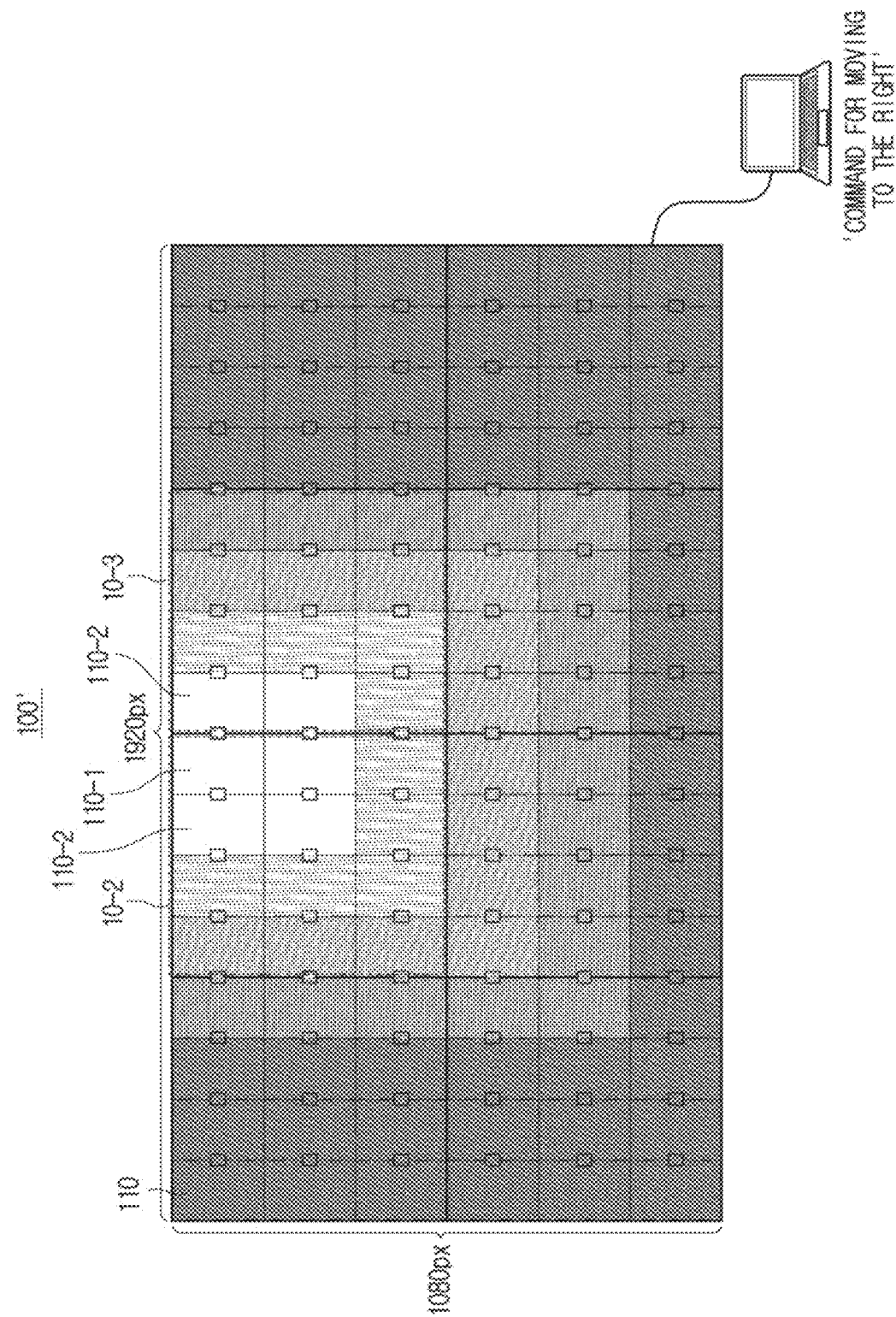
FIG. 7 is a diagram illustrating a display apparatus displaying a pattern and an electronic apparatus according to another embodiment of the disclosure.

FIG. 7 is a diagram illustrating a display apparatus displaying a pattern and an electronic apparatus according to another embodiment of the disclosure.

Referring to FIG. 7, a displaying module belonging to the second group 10-2 (i.e., the first display module 110-1) may be selected according to a user command, and the processor 130 may control the display panel 110 such that the first display module 110-1 and display modules adjacent to the first display module 110-1 (e.g., a display module belonging to the third group 10-3 (i.e., the at least one second display module 110-2)) display the same test image.

Here, the processor 130 may control the display panel 110 such that the respective remaining display modules constituting the display panel 110 output a test image having a luminance sequentially lower than the luminance of the first display module 110-1 as the distance from the first display module 110-1 corresponding to the user command increases. In this case, the image output by the display apparatus 100 may be similar to a gradation pattern image based on the first display module 110-1, as illustrated in FIG. 7.

However, this is merely an example, and embodiments of the disclosure are not limited thereto. For example, the processor 130 may control the display panel 110 such that the respective remaining display modules constituting the display panel 110 output a test image wherein the color, the chroma, the brightness, etc. sequentially increase or decrease compared to the test image displayed by the first display module 110-1 as the distance from the first display module 110-1 increases.

For example, the processor 130 may control the display panel 110 such that the respective remaining display modules constituting the display panel 110 output a test image by sequentially decreasing the chroma compared to the test image displayed by the first display module 110-1 as the distance from the first display module 110-1 increases. Here, sequentially increasing or decreasing may mean that the luminance, the color, the chroma, or the brightness are increased or decreased in proportion to the increase of the distance.

According to an embodiment of the disclosure, the processor 130 may control the display panel 110 such that only the first display module 110-1 corresponding to the user command and the at least one second display module 110-2 adjacent to the first display module 110-1 among the plurality of display modules 110-1 to 110-n output the same test image, and from a user's viewpoint, non-uniformity with another display module (e.g., the at least one second display module 110-2) can be resolved by fine tuning the luminance or the color value of the first display module 110-1 while the first display module 110-1 and the at least one second display module 110-2 are outputting a test image.

For example, if a signal corresponding to a key indicating increase or decrease of the luminance is received in the mode for adjusting the luminance of the display panel 110, the processor 130 may increase or decrease the luminance of the first display module 110-1 based on the received signal.

As another example, if a signal corresponding to a key indicating increase or decrease of the color is received in the mode for adjusting the color of the display panel 110, the processor 130 may increase or decrease the color of the first display module 110-1 based on the received signal. Here, the width of increase or decrease according to the signal may be set manually or automatically according to a user setting.

Also, the key indicating increase or decrease may be provided in an electronic apparatus performing communication via wire or wirelessly with the display apparatus 100. Also, it is obvious that the key can be one component of the input interface provided in the display apparatus 100.

In the aforementioned embodiment, specific numbers such as the first to eight groups, the first display module 110-1, the second display module 110-2, etc. are merely examples, and the processor 130 according to the various embodiments of the disclosure controls the display panel 110 such that a display module selected according to a user command, i.e., a target display module and display modules adjacent to it display a test image different from the remaining display modules.

According to an embodiment of the disclosure, if a user command selecting a specific display module (the first display module 110-1 according to FIG. 8) adjacent to the first display module 110-1 according to FIG. 7 in a first direction is received, the processor 130 may identify the specific display module and at least one display module adjacent to it (the second display module 110-2 according to FIG. 8) based on the information on the arrangement relation. Then, the processor 130 may control the display panel 110 such that the first display module 110-1 and the at least one second display module 110-2 display a test image, and the remaining display modules among the plurality of display modules 110-1 to 110-n display an image different from the test image.

Here, the image different from the test image may mean an image wherein at least one of the luminance, the color, the chroma, or the brightness was changed (e.g., increased or decreased) in the test image in proportion to the separated distance from the first display module 110-1.

Figure 8:
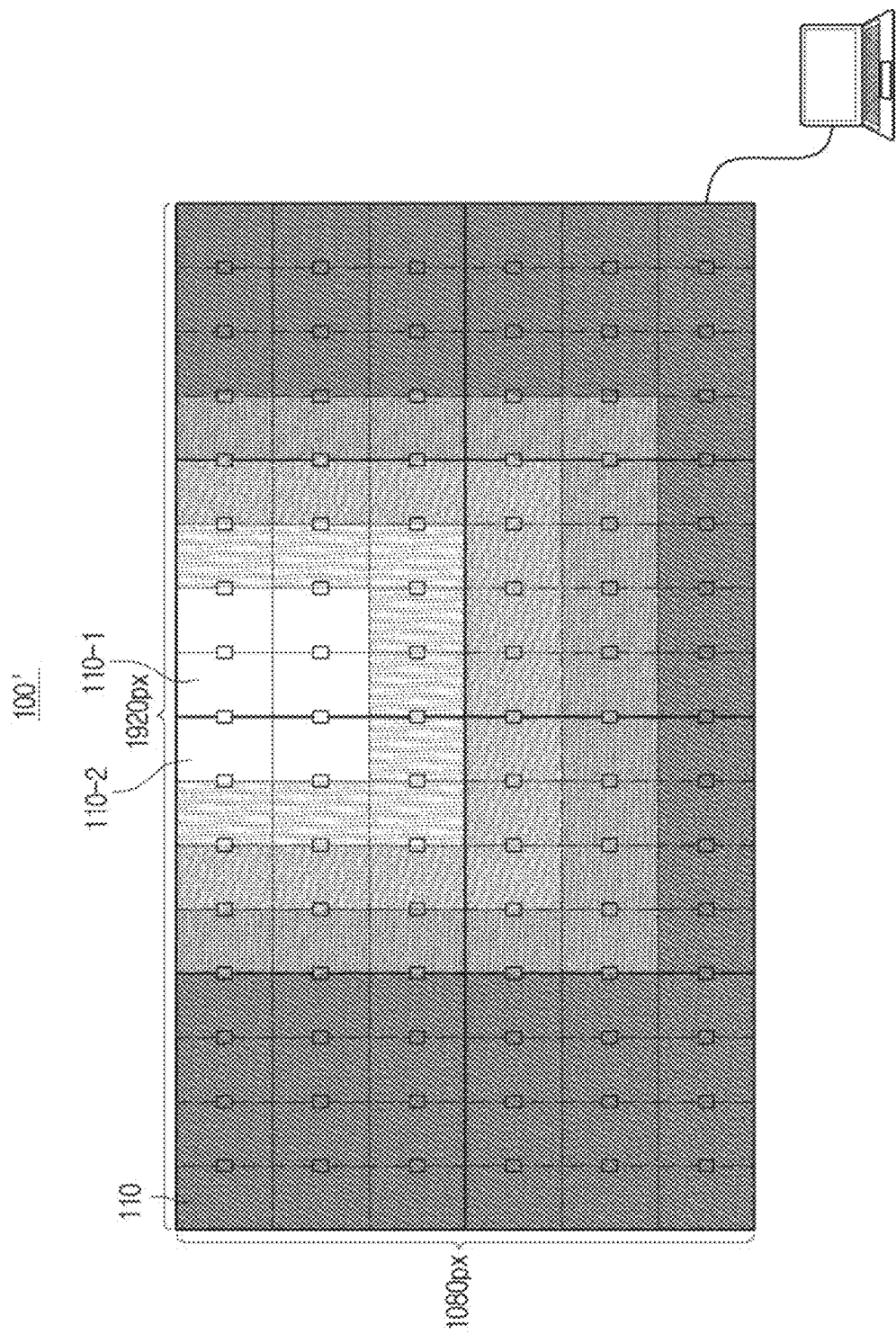
FIG. 8 is a diagram illustrating a display apparatus displaying a pattern in the case of selecting another display module according to an embodiment of the disclosure.

FIG. 8 is a diagram illustrating a display apparatus displaying a pattern in the case of selecting another display module according to an embodiment of the disclosure.

First, referring to FIG. 8, if a signal for moving the direction, or a signal selecting another display module is received through the electronic apparatus or the display apparatus 100, the processor 130 may change the target display module based on the signal.

Here, a signal for moving the direction means a signal for moving in four directions of up, down, left, and right, but this merely an example, and the disclosure is not limited thereto. For example, the signal can mean a signal for moving in eight directions of up, down, left, and right and diagonal directions.

For example, in FIG. 8, the display module corresponding to the user command, i.e., the target display module may be a specific display module belonging to the second group, and the target display module selected according to a command for moving to the right (or, a user command corresponding thereto) may be a specific display module belonging to the third group (the first display module 110-1 according to FIG. 8). The processor 130 according to an embodiment may identify a target display module corresponding to a user command (e.g., a signal for moving the direction, a signal selecting a specific display module, etc.) based on the information on the arrangement relation among the plurality of display modules 110-1 to 110-n.

Then, the processor 130 may identify at least one display module (hereinafter, the second display module 110-2) adjacent to the target display module (e.g., the first display module 110-1 belonging to the third group) changed based on the information on the arrangement relation stored in the memory 120.

Then, the processor 130 may control the display panel 110 such that the first display module 110-1 and the at least one second display module 110-2 display the same test image, and the remaining display modules among the plurality of display modules 110-1 to 110-n display an image different from the test image.

In this case, as the changed target display module and display modules adjacent thereto display the same test image, and the remaining display modules display a different image, from a user's viewpoint, the location of the changed target display module can be easily identified, and non-uniformity can be resolved by fine tuning the luminance value, the color value, etc. through comparison with adjacent display modules. Accordingly, non-uniformity of the display panel 110 including the plurality of display modules 110-1 to 110-n can be easily resolved.

In the aforementioned embodiment, explanation was made by assuming only the first mode, i.e., a general mode, but the aforementioned embodiment can be implemented in the second mode, i.e., a highlight mode.

According to an embodiment, the display apparatus 100 may include a general mode and a highlight mode.

As described above, the mode wherein the first display module 110-1 according to a user command (or, a user selection) and the at least one second display module 110-2 display the same test image, and the remaining display modules display a different test image will be generally referred to as a general mode.

It will be understood that the general mode can be divided into the mode wherein the first display module 110-1 and the at least one second display module 110-2 display the same test image, and the remaining display modules display a different test image, as illustrated in FIG. 3, and a mode wherein a pattern is displayed, as illustrated in FIG. 6.

The highlight mode according to an embodiment may be a mode wherein the first display module 110-1 according to a user command (or, a user selection) displays a test image, and the remaining display modules display a different test image from the first display module 110-1.

According to an embodiment, if the mode for adjusting the set value of the display panel 110 is selected (or executed), the processor 130 may provide a UI for receiving a user command selecting any one of the general mode or the highlight mode, and execute the mode corresponding to the user command (e.g., any one of the general mode or the highlight mode).

Then, according to the mode corresponding to the user command, i) in the case of the general mode, the processor 130 may control the display panel 110 such that the first display module 110-1 corresponding to the user selection and the at least one second display module 110-2 display the same test image, and ii) in the case of the highlight mode, the processor 130 may control the display panel 110 such that the first display module 110-1 corresponding to the user selection displays a different test image from the remaining display modules.

FIG. 9 is a flow chart illustrating a control method of a display apparatus according to an embodiment of the disclosure.

According to an embodiment, in a control method of a display apparatus including a display panel including a plurality of display modules, first, based on receiving a user command selecting any one of the plurality of display modules in a mode for adjusting a set value of the display panel, a first display module corresponding to the user command is identified in operation S910.

Then, at least one second display module adjacent to the first display module is identified based on information on an arrangement relation among the plurality of display modules in operation S920.

Then, the display panel is controlled such that the first display module and the at least one second display module display a test image, and the remaining display modules among the plurality of display modules display an image different from the test image in operation S930.

Here, the display panel may be divided into a plurality of groups including a plurality of display modules, and the information on the arrangement relation may include information on an arrangement relation among the plurality of groups. Also, the operation S920 of identifying the at least one second display module may include identifying the location of the first display module within a first group to which the first display module belongs, and identifying the at least one second display module in the first group based on the identified location.

The at least one second display module according to an embodiment of the disclosure may include a plurality of display modules located in up, down, left, and right directions or diagonal directions based on the first display module.

The operation S920 of identifying the at least one second display module according to an embodiment of the disclosure may include identifying the location of the first display module within the first group to which the first display module belongs, and identifying the at least one second display module in at least one of the first group or a second group adjacent to the first group based on the identified location and the information on the arrangement relation among the plurality of groups.

Here, the operation S920 of identifying the at least one second display module may include, based on identifying that the first display module is arranged to be adjacent to a display module in another group based on the identified location of the first display module, identifying the second group adjacent to the first group based on the information on the arrangement relation among the plurality of groups, and identifying the at least one second display module in the respective first group and second group based on the information on the arrangement relation among the plurality of display modules.

According to an embodiment of the disclosure, the mode for adjusting a set value of the display panel may be a mode for adjusting at least one of the luminance or the color of the display panel, and the control method according to an embodiment of the disclosure may further include, based on a user command for adjusting at least one of the luminance or the color of the selected first display module being input, adjusting at least one of the luminance or the color of the first display module based on the user command.

The control method according to an embodiment of the disclosure may further include, based on a user command selecting a third display module adjacent to the first display module in a first direction being received, identifying at least one fourth display module adjacent to the third display module based on the information on the arrangement relation, and controlling the display panel such that the third display module and the at least one fourth display module display a test image, and the remaining display modules among the plurality of display modules display an image different from the test image.

The operation S930 of controlling the display panel according to an embodiment may include controlling the display panel such that the respective remaining display modules display a test image wherein at least one of the luminance or the color is different from the test image displayed on the first display module and the at least one second display module based on the distance from the first display module.

Here, the operation S930 of controlling the display panel may include controlling the display panel such that the respective remaining display modules output a test image having a luminance sequentially lower than the luminance of the first display module as the distance from the first display module increases.

The control method according to an embodiment of the disclosure may further include, based on receiving a signal corresponding to a key indicating an increase or a decrease of the luminance in the mode for adjusting the luminance of the display panel, increasing or decreasing the luminance of the first display module based on the received signal, and based on receiving a signal corresponding to a key indicating an increase or a decrease of the color in the mode for adjusting the color of the display panel, increasing or decreasing the color of the first display module based on the received signal.

The various embodiments of the disclosure can be applied not only to an electronic apparatus, but also to electronic apparatuses of all types including a display.

The various embodiments described above may be implemented in a recording medium that is readable by a computer or a device similar thereto, by using software, hardware or a combination thereof. In some cases, the embodiments described in this specification may be implemented as a processor itself. According to implementation by software, the embodiments such as procedures and functions described in this specification may be implemented as separate software modules. Each of the software modules may perform one or more functions and operations described in this specification.

Computer instructions for performing processing operations of an electronic apparatus according to the aforementioned various embodiments of the disclosure may be stored in a non-transitory computer-readable medium. Computer instructions stored in such a non-transitory computer-readable medium make the processing operations at the electronic apparatus 100 according to the aforementioned various embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

While embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A display apparatus comprising:
a display panel comprising a plurality of display modules;
a memory storing information on an arrangement relation of the plurality of display modules; and
a processor configured to:
based on receiving a user command from an electronic apparatus external to the display apparatus in a mode for adjusting a set value of the display panel, identify a first display module corresponding to the user command among the plurality of display modules, the user command being a command for selecting the first display module among the plurality of display modules,
identify at least one second display module adjacent to the first display module among the plurality of display modules, based on the information on the arrangement relation, and
control the display panel such that each of the first display module and the at least one second display module displays a test image, and each of remaining display modules among the plurality of display modules displays an image different from the test image.

2. The display apparatus of claim 1, wherein the display panel is divided into a plurality of groups of display modules,
the information on the arrangement relation comprises information on an arrangement relation of the plurality of groups, and
the processor is further configured to:
identify a location of the first display module within a first group, among the plurality of groups, to which the first display module belongs, based on the information on the arrangement relation of the plurality of groups, and
identify the at least one second display module in the first group based on the identified location of the first display module.

3. The display apparatus of claim 2, wherein the at least one second display module includes at least two display modules adjacent to the first display module in an up direction, a down direction, a left direction, a right direction, or a diagonal direction with respect to the first display module.

4. The display apparatus of claim 2, wherein the processor is further configured to:
identify the at least one second display module in at least one of the first group or a second group adjacent to the first group based on the identified location of the first display module and the information on the arrangement relation among the plurality of groups.

5. The display apparatus of claim 4, wherein the processor is further configured to:
based on identifying that the first display module is adjacent to a display module in another group based on the identified location of the first display module, identify the second group adjacent to the first group based on the information on the arrangement relation of the plurality of groups, and
identify the at least one second display module in the second group based on the information on the arrangement relation of the plurality of display modules.

6. The display apparatus of claim 1, wherein the mode for adjusting the set value of the display panel is a mode for adjusting at least one of a luminance or a color of the display panel, and
the processor is further configured to:
based on a user command for adjusting at least one of the luminance or the color of the first display module being input, adjust at least one of the luminance or the color of the first display module based on the user command.

7. The display apparatus of claim 1, wherein the processor is further configured to:
based on a user command selecting a third display module, among the plurality of display modules, adjacent to the first display module in a first direction being received, identify at least one fourth display module, among the plurality of display modules, adjacent to the third display module based on the information on the arrangement relation, and
control the display panel such that each of the third display module and the at least one fourth display module displays the test image, and each of the remaining display modules among the plurality of display modules displays the image different from the test image.

8. The display apparatus of claim 1, wherein the processor is further configured to:
control the display panel such that each of the respective remaining display modules displays the test image having at least one of a luminance or a color that is different from a luminance or a color of the test image displayed on each of the first display module and the at least one second display module, based on a distance from the first display module.

9. The display apparatus of claim 8, wherein the processor is further configured to:
control the display panel such that each of the respective remaining display modules displays the test image having the luminance that is sequentially lower than the luminance of the first display module as the distance from the first display module increases.

10. The display apparatus of claim 8, wherein the processor is further configured to:
based on receiving a signal corresponding to an increase or a decrease of the luminance in the mode for adjusting the luminance of the display panel, increase or decrease the luminance of the first display module based on the received signal, and
based on receiving a signal corresponding to an increase or a decrease of the color in the mode for adjusting the color of the display panel, increase or decrease the color of the first display module based on the received signal.

11. The display apparatus of claim 1, wherein at least one of the luminance or the color of the image displayed by each of the remaining display modules among the plurality of display modules is gradually changed according to a distance from the first display module.

12. A control method of a display apparatus comprising a display panel comprising a plurality of display modules, the control method comprising:
based on receiving a user command from an electronic apparatus external to the display apparatus in a mode for adjusting a set value of the display panel, identifying a first display module corresponding to the user command among the plurality of display modules, the user command being a command for selecting the first display module of the plurality of display modules;

identifying at least one second display module adjacent to the first display module among the plurality of display modules, based on information on an arrangement relation of the plurality of display modules; and controlling the display panel such that each of the first display module and the at least one second display module displays a test image, and each of remaining display modules among the plurality of display modules displays an image different from the test image.

13. The control method of claim 12, wherein the display panel is divided into a plurality of groups of display modules, the information on the arrangement relation comprises information on an arrangement relation of the plurality of groups, and the identifying the at least one second display module comprises:

identifying a location of the first display module within a first group, among the plurality of groups, to which the first display module belongs, based on the information on the arrangement relation of the plurality of groups; and identifying the at least one second display module in the first group based on the identified location of the first display module.

14. The control method of claim 13, wherein the at least one second display module comprises at least two display modules adjacent to the first display module in an up direction, a down direction, a left direction, a right direction, or a diagonal direction with respect to the first display module.

15. The control method of claim 13, wherein the identifying the at least one second display module comprises:

identifying the at least one second display module in at least one of the first group or a second group adjacent to the first group based on the identified location of the first display module and the information on the arrangement relation of the plurality of groups.

16. The control method of claim 15, wherein the identifying the at least one second display module comprises:

based on identifying that the first display module is adjacent to a display module in another group based on the identified location of the first display module, identifying the second group adjacent to the first group based on the information on the arrangement relation of the plurality of groups; and identifying the at least one second display module in the second group based on the information on the arrangement relation of the plurality of display modules.

17. The control method of claim 12, wherein the mode for adjusting the set value of the display panel is a mode for adjusting at least one of a luminance or a color of the display panel, and the control method further comprises:

based on a user command for adjusting at least one of the luminance or the color of the first display module being input, adjusting at least one of the luminance or the color of the first display module based on the user command.

18. The control method of claim 12, further comprising:

based on a user command selecting a third display module, among the plurality of display modules, adjacent to the first display module in a first direction being received, identifying at least one fourth display module, among the plurality of display modules, adjacent to the third display module based on the information on the arrangement relation, and controlling the display panel such that each of the third display module and the at least one fourth display module displays the test image, and each of the remaining display modules among the plurality of display modules display the image different from the test image.

19. The control method of claim 12, wherein the controlling the display panel comprises controlling the display panel such that each of the respective remaining display modules displays the test image having at least one of a luminance or a color that is different from a luminance or a color of the test image displayed on each of the first display module and the at least one second display module, based on a distance from the first display module.

20. The control method of claim 19, wherein the controlling the display panel comprises controlling the display panel such that each of the respective remaining display modules displays the test image having the luminance that is sequentially lower than the luminance of the first display module as the distance from the first display module increases.

21. The control method of claim 19, further comprising:

based on receiving a signal corresponding to an increase or a decrease of the luminance in the mode for adjusting the luminance of the display panel, increasing or decreasing the luminance of the first display module based on the received signal, and based on receiving a signal corresponding to an increase or a decrease of the color in the mode for adjusting the color of the display panel, increasing or decreasing the color of the first display module based on the received signal.

22. The control method of claim 12, wherein at least one of the luminance or the color of the image displayed by each of the remaining display modules among the plurality of display modules is gradually changed according to a distance from the first display module.

* * * * *